(12) United States Patent
Zhang et al.

(10) Patent No.: US 9,245,032 B2
(45) Date of Patent: Jan. 26, 2016

(54) GLOBALIZATION FRAMEWORK FOR PROVIDING LOCALE-SPECIFIC SERVICES USING CLIENT-SIDE SCRIPTING LANGUAGES

(75) Inventors: Weiran Zhang, Redwood City, CA (US); Kenneth Tang, Pacifica, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1128 days.

(21) Appl. No.: 11/145,431

(22) Filed: Jun. 2, 2005

(65) Prior Publication Data

US 2006/0277286 A1    Dec. 7, 2006

(51) Int. Cl.
  G06F 15/16    (2006.01)
  G06F 17/30    (2006.01)
  H04L 29/08    (2006.01)

(52) U.S. Cl.
  CPC .......... *G06F 17/30867* (2013.01); *H04L 67/02* (2013.01)

(58) Field of Classification Search
  CPC .... H04L 67/10; G06F 17/30867; G06F 15/16
  USPC ................. 709/203, 219, 217, 246
  See application file for complete search history.

(56) References Cited

U.S. PATENT DOCUMENTS

| | | | | |
|---|---|---|---|---|
| 5,848,386 A * | 12/1998 | Motoyama | ......... | 704/5 |
| 5,930,746 A * | 7/1999 | Ting | ......... | 704/9 |
| 6,038,598 A * | 3/2000 | Danneels | ......... | 709/219 |
| 6,247,050 B1 * | 6/2001 | Tso et al. | ......... | 709/224 |
| 6,915,328 B2 * | 7/2005 | Turnbull | ......... | 709/203 |
| 6,964,014 B1 * | 11/2005 | Parish | ......... | 715/205 |
| 6,993,568 B1 * | 1/2006 | Hauduc et al. | ......... | 709/217 |
| 7,051,084 B1 * | 5/2006 | Hayton et al. | ......... | 709/219 |
| 7,082,475 B2 * | 7/2006 | Haverstock et al. | ......... | 709/246 |
| 2002/0032701 A1 * | 3/2002 | Gao et al. | ......... | 707/513 |
| 2002/0129064 A1 * | 9/2002 | Guthrie | ......... | 707/513 |
| 2002/0165724 A1 * | 11/2002 | Blankesteijn | ......... | 705/1 |

(Continued)

FOREIGN PATENT DOCUMENTS

WO    WO2004/021124    *    3/2004

OTHER PUBLICATIONS

Wise, Rosmarie. Client or Server Side Scripting, What's the Difference? [Online]. Dec. 25, 2001 [Retrieved on Jul. 15, 2008] Retrieved from: http://websiteowner.info/articles/cgi/whichside.asp.*

(Continued)

*Primary Examiner* — June Sison
*Assistant Examiner* — Steven Nguyen
(74) *Attorney, Agent, or Firm* — Kilpatrick Townsend & Stockton LLP

(57) ABSTRACT

A method for providing a locale-specific module for client-side processing of documents is provided. The method includes intercepting a request at a server from an interface located at a client. The request may be a hypertext transfer protocol (HTTP) request from a web browser. The server determines locale preferences from the request. The server then determines a locale-specific module for the locale preferences. The locale-specific module is then sent to the client. The interface may use the module to provide locale-specific elements when executing scripts received in documents from the server. The scripts are executed at the client side and the locale-specific elements are determined and displayed in the documents.

24 Claims, 6 Drawing Sheets

(56) References Cited

U.S. PATENT DOCUMENTS

| | | | |
|---|---|---|---|
| 2003/0140045 A1* | 7/2003 | Heninger et al. | 707/10 |
| 2005/0102616 A1* | 5/2005 | Thurston | 715/513 |
| 2005/0114329 A1* | 5/2005 | Dettinger et al. | 707/5 |
| 2006/0259544 A1* | 11/2006 | Zubenko et al. | 709/203 |
| 2009/0234823 A1* | 9/2009 | Wong | 707/4 |

OTHER PUBLICATIONS

Server-Side vs. Client-Side Scripting [Online]. Sep. 16, 1999 [Retrieved on Jul. 15, 2008] Retrieved from: http://web.archive.org/web/19990916131435/http://www.asp101.com/tips/index.asp?id=25.*

Zhou, Yilu et al. Multilingual Web Retrieval: An Experiment on a Multilingual Business Intelligence Portal [Online]. Jan. 3, 2005 [Retrieved on Jul. 18, 2008] IEEE CNF. Proceedings of the 38th Annual Hawaii International Conference on System Sciences. Retrieved from: http://ieeexplore.ieee.org/iel5/9518/30166/01385319.pdf?tp=&arnumber=1385319.*

XLIFF 1.1 A white paper on version 1.1 of the XML Localisation Interchange File Format (XLIFF), Jul. 22, 2003. pp. 1-33.*

International Business Machines Corporation, "Automatic Best Resolution/Color Web Image", Research Disclosure, Mason Publications, Hampshire, GB, vol. 441, No. 128, (Jan. 2001), 1 page total.

* cited by examiner

GLOBALIZATION FRAMEWORK FOR PROVIDING LOCALE-SPECIFIC SERVICES USING CLIENT-SIDE SCRIPTING LANGUAGES

BACKGROUND OF THE INVENTION

The present invention generally relates to dynamic web page generation and more specifically to techniques for providing locale-specific services for client-side processing of documents.

The Internet is used globally. Web pages are accessed by many users who understand many different languages. Because of this, it is desirable to present web pages to users in their preferred language. For example, a user who downloads a web page in France may want their web page to be displayed in French; a user who downloads the same web page in the United States may want their web page to be displayed in English.

Traditionally, locale-specific contents are rendered on the server side. For example, when a request is received for a web page, the server renders a web page into a certain language and sends the result to the client. Other locale-specific operations that may be performed include data formatting, linguistic sorting, etc. If many web pages that require these renderings are being requested, the server may become overloaded. Accordingly, the efficiency and speed of serving web pages is degraded.

Accordingly, it is desirable to provide client-side processing of locale preferences for displaying web pages and other documents.

BRIEF SUMMARY OF THE INVENTION

Embodiments of the present invention generally relate to providing locale-specific services for client-side processing of documents. In one embodiment, a method for providing a locale-specific module for client-side processing of documents is provided. The method includes intercepting a request at a server from an interface located at a client. The request may be a hypertext transfer protocol (HTTP) request from a web browser.

The server determines locale preferences from the request. For example, a request may include a list of locales that are preferred by a user. The server then determines a locale-specific module for the locale preferences. The preferences may be a location, such as Britain, a language, such as English, or a location and language, such as British-English. For example, if the locale preference is British-English, then a locale-specific module for British-English is determined. Additionally, logic may be used to determine a best match for a locale preference if the locale is not offered by locale-specific modules or a default locale-specific module may be determined.

The locale-specific module is then sent to the client. The interface may use the module to provide locale-specific elements when executing scripts received in documents from the server. The scripts are executed at the client side and the locale-specific elements are determined and displayed in the documents. In one embodiment, a web page may be returned to the client that includes one or more scripts. The scripts are executed and access the locale-specific module in order to provide locale-specific elements on the web page.

In one embodiment, a method for providing locale-specific services for client-side processing of documents is provided. The method comprises: intercepting a request for a document at a server from an interface at a client; determining a locale preference from the request; determining a locale-specific module for the locale preferences; and sending the locale-specific module to the client, wherein the interface uses the module to display locale-specific elements according to the locale preference of the interface when executing a script received in the document from the server.

In another embodiment, a system for providing locale-specific module for client-side processing of web pages is provided. The system comprises: a client comprising an interface configured to send a request for a document and to display the document using scripts included in the web page; and a server configured to receive the request and including a locale-specific determiner configured to: determine locale preferences from the request; determine a locale-specific module for the locale preferences; and wherein the server is configured to send the locale-specific module to the client, wherein the interface uses the module to display locale-specific elements according to the locale preferences of the interface when executing a script received in the document from the server.

In yet another embodiment, an information storage medium having a plurality of inst providing locale-specific services for client-side processing of documents is provided. The steps include: intercepting a request for a document at a server from an interface at a client; determining a locale preference from the request; determining a locale-specific module for the locale preferences; and sending the locale-specific module to the client, wherein the interface uses the module to display locale-specific elements according to the locale preference of the interface when executing a script received in the document from the server.

A further understanding of the nature and the advantages of the inventions disclosed herein may be realized by reference of the remaining portions of the specification and the attached drawings.

DETAILED DESCRIPTION OF THE INVENTION

Figure 1:
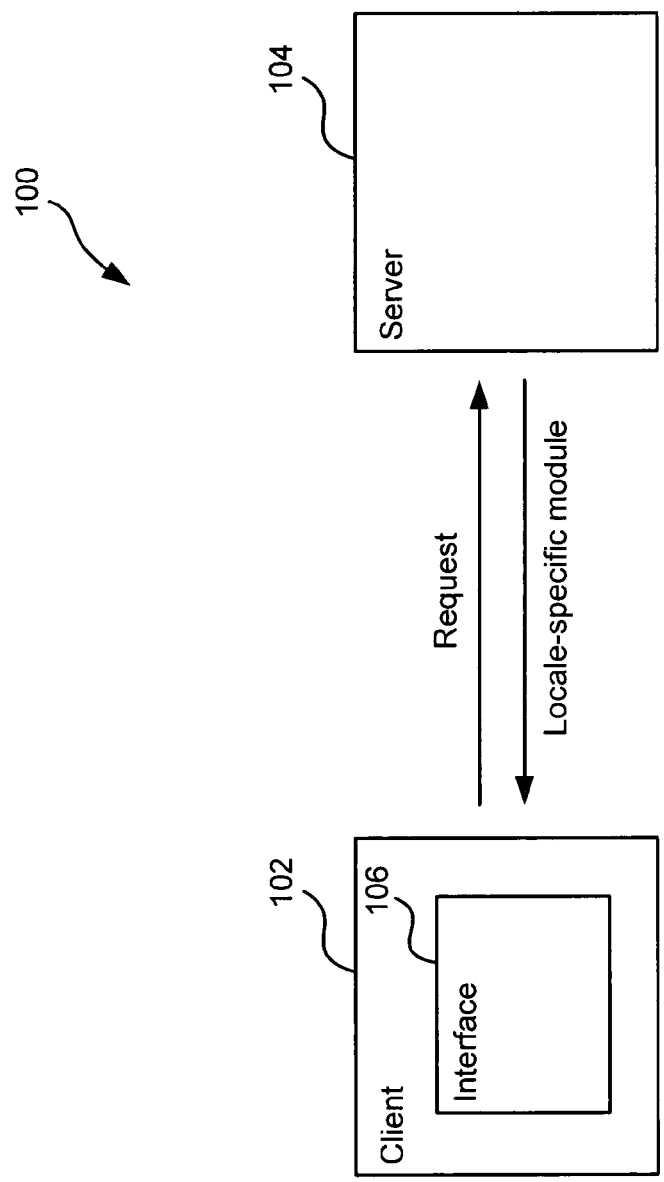
FIG. 1 depicts a block diagram of a system for providing client-side locale-specific services according to one embodiment of the present invention.

FIG. 1 depicts a block diagram of a system 100 for providing client-side locale-specific services according to one embodiment of the present invention. As shown, a client 102 and server 104 are included in system 100. Although client 102 and server 104 are shown, it will be understood that there may be multiple instances of client 102 and server 104. Also, other elements of a network or Internet have been omitted from system 100 but a person skilled in the art will appreciate elements used in the communication between client 102 and server 104.

Client 102 includes any device configured to communicate with server 104. For example, client 102 may be a personal computer, a laptop computer, workstation, personal digital assistant (PDA), pocket PC, or any other computing device. In one embodiment, client 102 is connected to a network, such as the Internet, and can send requests that are processed by a server 104.

Client 102 may use an interface 106 in order to request documents from server 104. A document may include information that is used to display a page. For example, a web page may be written in a language, such as HyperText Markup Language (HTML), wherein HTML code for the document is used to display the page. The documents may include executable scripts, for example, Dynamic HTML (DHTML), VBscript, etc. may be used to provide the executable scripts in the documents. The scripts are configured to be executed by client 102 when the page is displayed. The use of scripts in documents is well known in the art. The term web page will be used below; however, it will be recognized that a web page may be any document that can include executable scripts, such as a spreadsheet, word processor document, etc.

Interface 106 may be any software application, such as a graphical user interface, web browser, etc. In one embodiment, interface 106 may request web pages from a website as is known in the art. The requested web page is then routed from server 104 to client 102 for display on interface 106.

Server 104 is configured to serve the web pages to interface 106. As is well known in the art, an HTTP request may be sent using a uniform resource locator (URL). The HTTP request is received at a server 104, which is configured to serve a web page to interface 106. Further details of the interaction between client 102 and server 104 used to serve documents that are displayed on interface 106 will not be described as it is well known in the art.

Server 104 determines any locale preferences in a request received from client 102. In one embodiment, the locale preferences are preferences that are set in interface 106. For example, the locale preferences may indicate a preferred locale or language. The preferences may be a location, such as Britain, a language, such as English, or a location and language, such as British-English. The locale preferences may also be preferences for any kind of formatting—for example, the locale preference may indicate 24 hour time display is preferred. These locale preferences may be found in a header of the request such as an HTTP request header. For example, English, French, etc. may be listed in the request as the locale preferences.

Server 104 then determines a locale-specific module that corresponds to the locale preferences. For example, a locale-specific module may be provided for English, French, and any other locales. Depending on the locale preferences, a locale-specific module is determined and sent back to the client 102.

The locale-specific module is stored and when the web page is displayed by interface 106, scripts in the web page are executed. The scripts use the locale-specific module in order to display elements of the page. The elements on the page are locale-specific and correspond to the locale preferences of the interface 106. For example, if the locale preference of interface 106 is French, then certain elements of the web page may be displayed in the French language. Other operations that may be performed are locale-specific formatting. For example, the date and time may be formatted differently for different locales. In one example, some international countries format their dates as year/month/day while other countries format their dates as month/day/year. Depending on the locale, locale-specific modules 206 may be configured to output the correct date/time format. Further, the time may be outputted either in a 12-hour or 24-hour clock format. Basically, any operations that are based on a locale can be performed.

Figure 2:
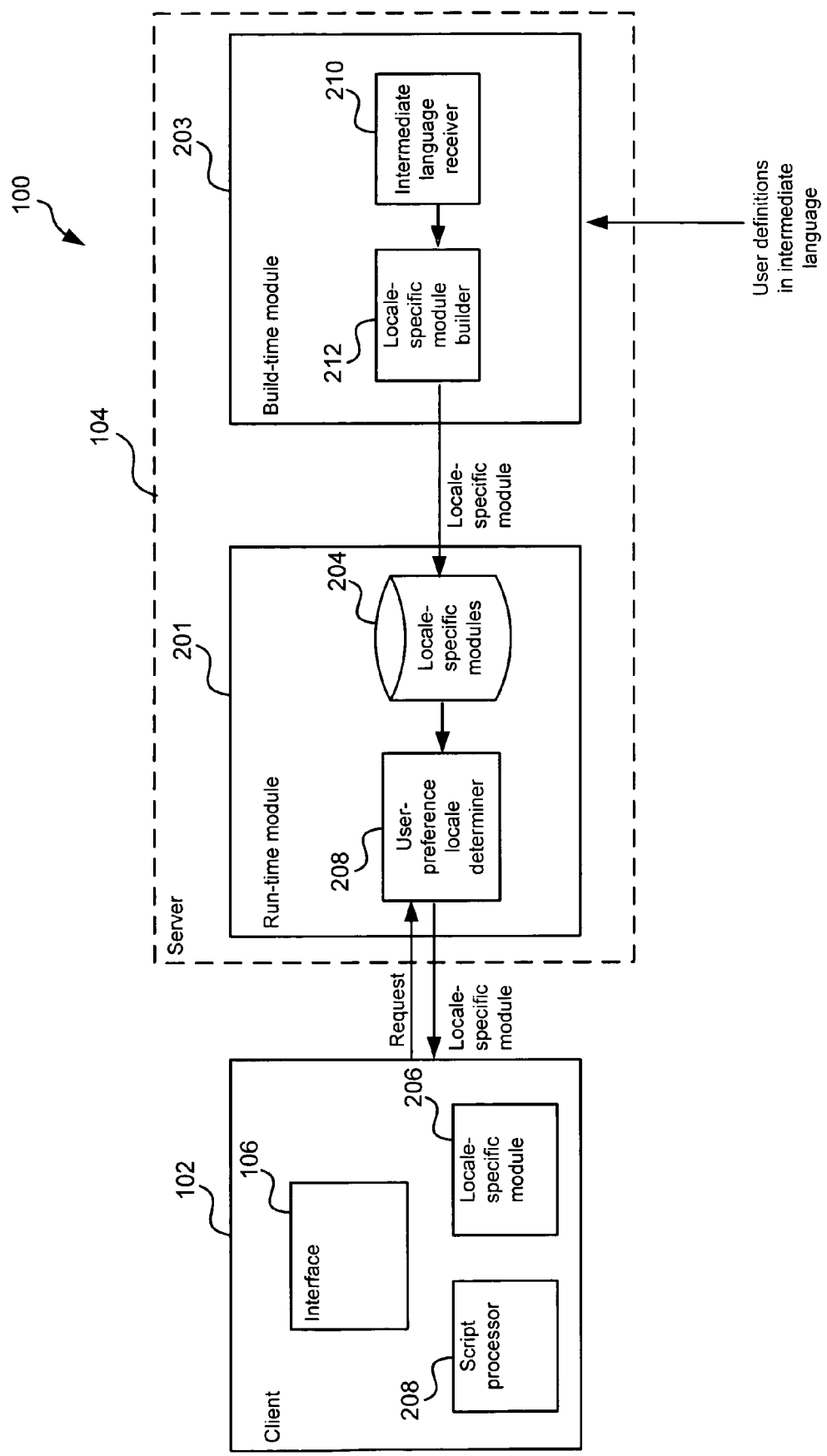
FIG. 2 depicts a more detailed embodiment of system according to one embodiment of the present invention.

FIG. 2 depicts a more detailed embodiment of system 100 according to one embodiment of the present invention. Server 104 includes a run-time module 201 and a build-time module 203. Run-time module 201 is configured to process requests from client 102 in order to determine a locale-specific module 206 for sending to client 102. Build-time module 203 is configured to receive user definitions in order to create locale-specific modules 206. Locale-specific modules 206 may then be stored in a storage device 204 for access by run-time module 201. The process for displaying web pages using locale-specific modules 206 will be described first followed by the process of creating locale-specific modules 206.

As shown, requests are sent from client 102 for a web page. User-preference locale determiner 208 of run-time module 201 intercepts the request and is configured to determine a locale-specific module 206. As discussed above, user-preference locale determiner 208 determines the locale preferences from the request. From these locale preferences, a locale-specific module 206 from storage device 204 is retrieved. The methods of determining a locale-specific module 206 will be described in more detail below. These methods include determining a match for the user preferences, but if a match is not determined, determining a best fit locale-specific module 206 or a default locale-specific module 206. Once a locale-specific module 206 is determined, it is sent to client 102.

In one embodiment, a user may set user preferences using interface 106. For example, interface 106 may include an option or preferences settings where a user can set their preferred locale. If the user does not set a preferred locale, interface 106 may have a default locale that it is set to. In one embodiment, a user may set many locales in a list of the preferred locales.

In one embodiment, the above user preferences for interface 106 may be different from locale preferences that are set in an operating system. For example, client 102 may be running an operating system, such as Microsoft Windows. The operating system may have one set of locale settings and interface 106 may also include another set of locale settings. The settings for interface 106 are usually set by a user according to their preference. For example, many users may be using client 102. Each separate user may, however, have different locale preferences. The users can then set the locale preferences in interface 106. Thus, the preferences in interface 106 may be more tailored to a user using interface 106. The settings of the operating system, however, are often hard to access and change. These settings also are typically not sent to a server 104 with a request for a web page.

When a request is sent for a web page, the preferences of interface 106 are sent with the request. For example, an HTTP Accept-Language header may include entries that indicate a list of locales as set in the locale preferences of interface 106. This request is sent and intercepted by run-time module 201.

When client 102 receives locale-specific module 206, it may be stored in, for example, a cache. Once locale-specific module 206 is sent to client 102, requests with the same user preferences do not need to be processed by run-time module 201 if the correct locale-specific module 206 has already been sent to client 102. Client 102 can just refer to the same locale-specific module 206.

When interface 106 receives the requested web page, the web page may include scripts that are executed when the web page is displayed. For example, using dynamic HTML (DHTML), VBScript, or any other language, scripts, such as javascripts, VBscripts, plug-ins, etc., may be embedded in a web page. The scripts are executed when the page is initially displayed. Also, the scripts may be executed thereafter while the page is being updated. For example, if the page is continually updated, then the scripts may be executed over a period of time while the page is being displayed.

In one embodiment, when the script is being executed, a script processor 208 accesses locale-specific module 206 in order to display locale-specific elements for the page. For example, when an element is encountered on the page, script processor 208 determines a value that should be displayed for the element. In one example, if an element is a log-in tag, then locale-specific module 206 indicates that for this locale, the word "log-in" should be displayed for the tag. This is because the locale preference of the locale-specific module is English. The script processor 208 retrieves the value and displays it on the page in interface 106.

Figure 3:
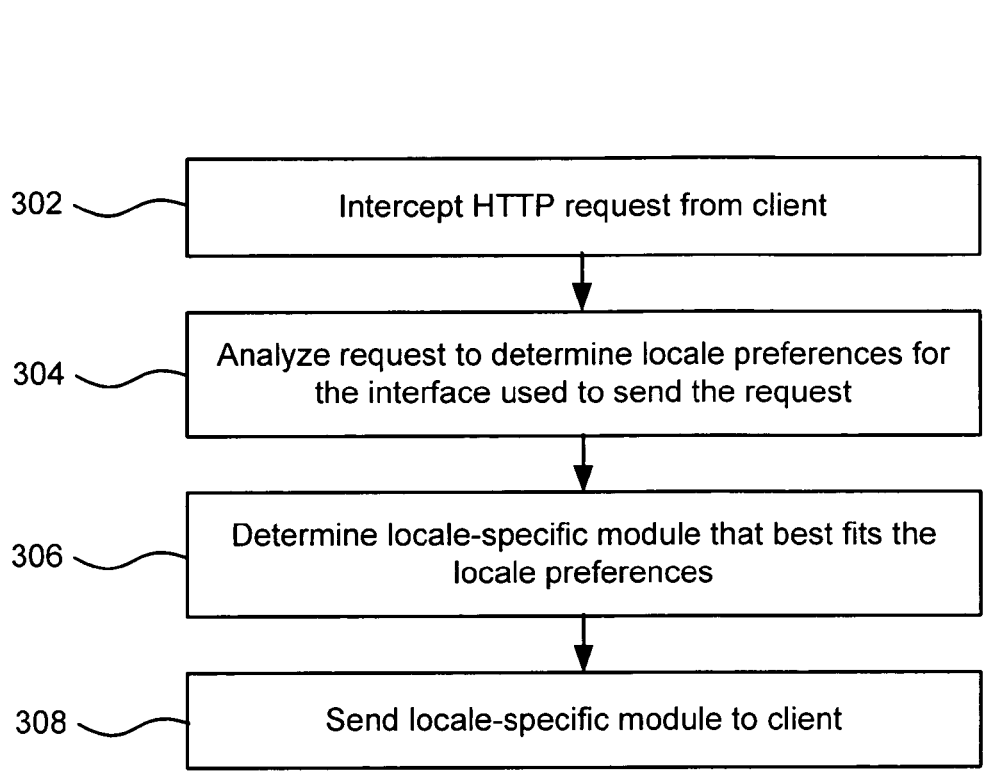
FIG. 3 depicts a simplified flowchart of a method for determining a locale-specific module according to one embodiment of the present invention.

FIG. 3 depicts a simplified flowchart 300 of a method for determining a locale-specific module according to one embodiment of the present invention. In step 302, user preference locale determiner 202 intercepts a request from client 102. In one embodiment, an HTTP request may be sent in order to download a web page from a web site. Server 104 receives the request and is configured to process the download request.

In step 304, the request is analyzed to determine locale preferences so that the browser in use is used to send a request. In one embodiment, the HTTP request, and specifically the HTTP Accept-Language header, may be analyzed. In one example, the header may include the entries: zh-HK, FR-BE; q=0.8, es; q=0.7. In the header, FR-BE may correspond to the locale French-Belgium. This means that this locale is the French language spoken in Belgium. Also, es may be the Spanish language and zh-HK may be the Chinese language as spoken in Hong Kong. Thus, the user preference is Chinese-Hong Kong and then French from Belgium. The q-value after each language indicates the user's preference for that language on a scale of 0.0 to 1.0. This value may be used to determine which locale is most preferred for the user.

In step 306, a locale-specific module 206 that best fits the locale preferences is determined. For example, locale-specific modules 206 stored in database 204 may include the following definitions for English (en) and French-Belgium (FR-BE). A locale specific module 206 for Chinese-Hong Kong is not found. But, because FR-BE is matched, then it is determined that this locale-specific module 206 best fits the locale preferences. As will be discussed below, fallback logic may be provided that determines a locale-specific module 206 if no direct matches are found.

In step 308, the locale-specific module 206 is sent to client 102.

Figure 4:
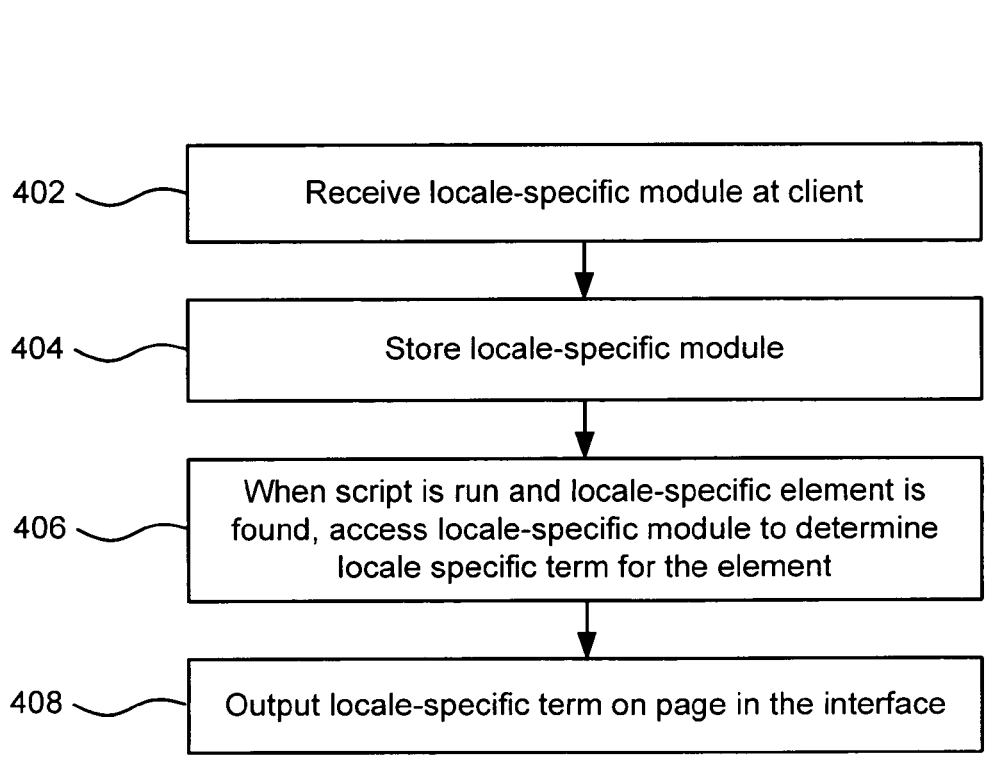
FIG. 4 depicts a simplified flowchart of a method for client-side processing of a locale-specific module according to one embodiment of the present invention.

FIG. 4 depicts a simplified flowchart 400 of a method for client-side processing of a locale-specific module 206 according to one embodiment of the present invention. In 402, locale-specific module 206 is received at client 102. In step 404, locale-specific module 206 is stored at client 102. For example, it may be stored in a cache or any other easily accessed storage area in client 102 or in an area accessible to client 102.

In step 406, when a script is run for the web page and a locale-specific element is found, locale-specific module 206 is accessed to determine a locale-specific term for the element. For example, locale-specific module 206 may include a list of labels and terms. The labels may correspond to labels found in software code used for displaying the page. As is well known in the art, a language, such as HTML, may be used to write code for a web page. The code is used to display the web page. For example, a login label may be included in the code. When a script is run and that label is encountered in the code, the label in locale-specific module 206 is determined. The term for that label is accessed and outputted for the label on the page. Accordingly, because locale-specific module 206 corresponds to the locale preferences of the interface 106, the terms found in locale-specific module 206 can be outputted for labels for the webpage. Thus, generic labels may be used in writing web pages. Then, locale-specific terms in the locale-specific module 206 are outputted for labels of the webpage. Thus, generic web pages may be written and then may be customized based on the locale-specific modules 206 that are provided to client 102.

Accordingly, in step 408, the locale-specific term is then outputted in the web page on interface 106.

In sum, because locale-specific modules 206 are sent to client 102 and used to output pages, there is no dependency on browser interpreters or underlying platforms or operating systems. Rather, scripts found in a page returned from server 104 are executed and used to output the locale-specific elements. Therefore, the locale behavior is consistent regardless of the type of interfaces 102 used and is fully configurable using run-time module 201.

Figure 5:
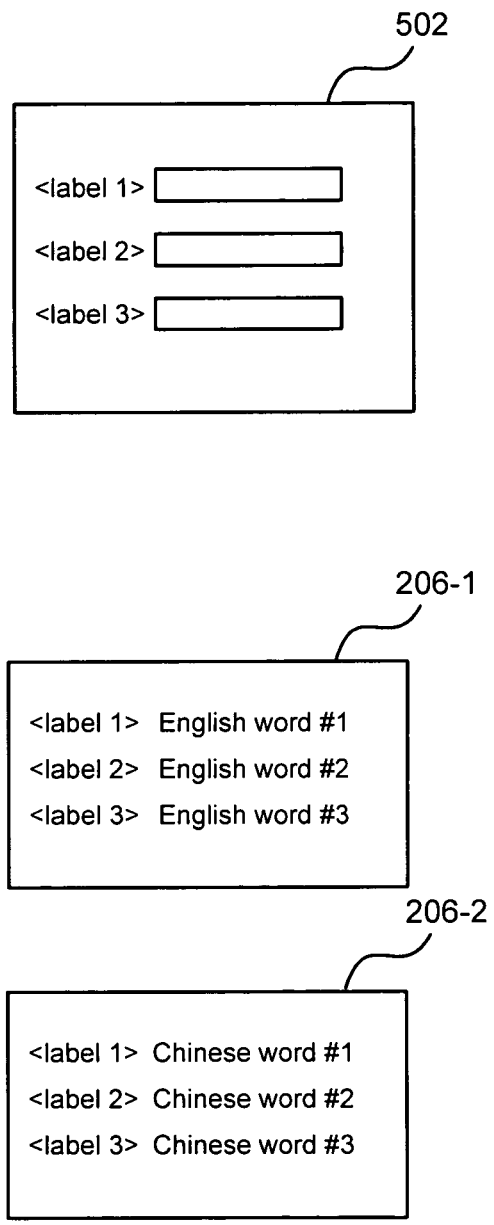
FIG. 5 shows an example of code for a web page and examples of locale-specific modules according to one embodiment of the present invention.

FIG. 5 shows an example of code for a web page 502 and examples of locale-specific modules 206 according to one embodiment of the present invention. As shown, code for a web page 502 includes three labels: <label 1>, <label 2>, and <label 3>. These labels may be written in dynamic HTML. As is known in the art, the code may be used to display a web page on interface 106.

A script embedded in web page 502 may be executed and call a stored locale-specific module 206. In one embodiment, depending on the locale preferences of interface 106, one of locale-specific module 206-1 or locale-specific module 206-2 may be sent to client 102. Depending on which locale-specific module 206 is stored, the output for web page 502 on interface 106 may be different.

For example, locale-specific module 206-1 may be for the English language locale and locale-specific module 206-2 may be for a Chinese language locale. As shown, for <label 1>, <label 2>, and <label 3>, three different English words are provided in locale-specific module 206-1. In locale-specific module 206-2, for <label 1>, <label 2>, and <label 3>, three different Chinese words are provided. Thus, depending on which locale-specific module 206 has been sent to client 102, different words will be displayed for <label 1>, <label 2>, and <label 3> in web page 502 when scripts embedded in web page 502 are executed.

In one embodiment, locale-specific modules 206 may be delta files. The delta files contain only the changed elements that will be recombined on the top of base resources during run-time to achieve the customized behavior. This approach eliminates data duplication, and retains customized definitions during application upgrades. The delta files include only the changed elements. For example, a customization may need to modify the name of a particular user-interface label but leave the other labels unchanged. In this case, the delta file would contain only the definition of the changed label.

Figure 6:
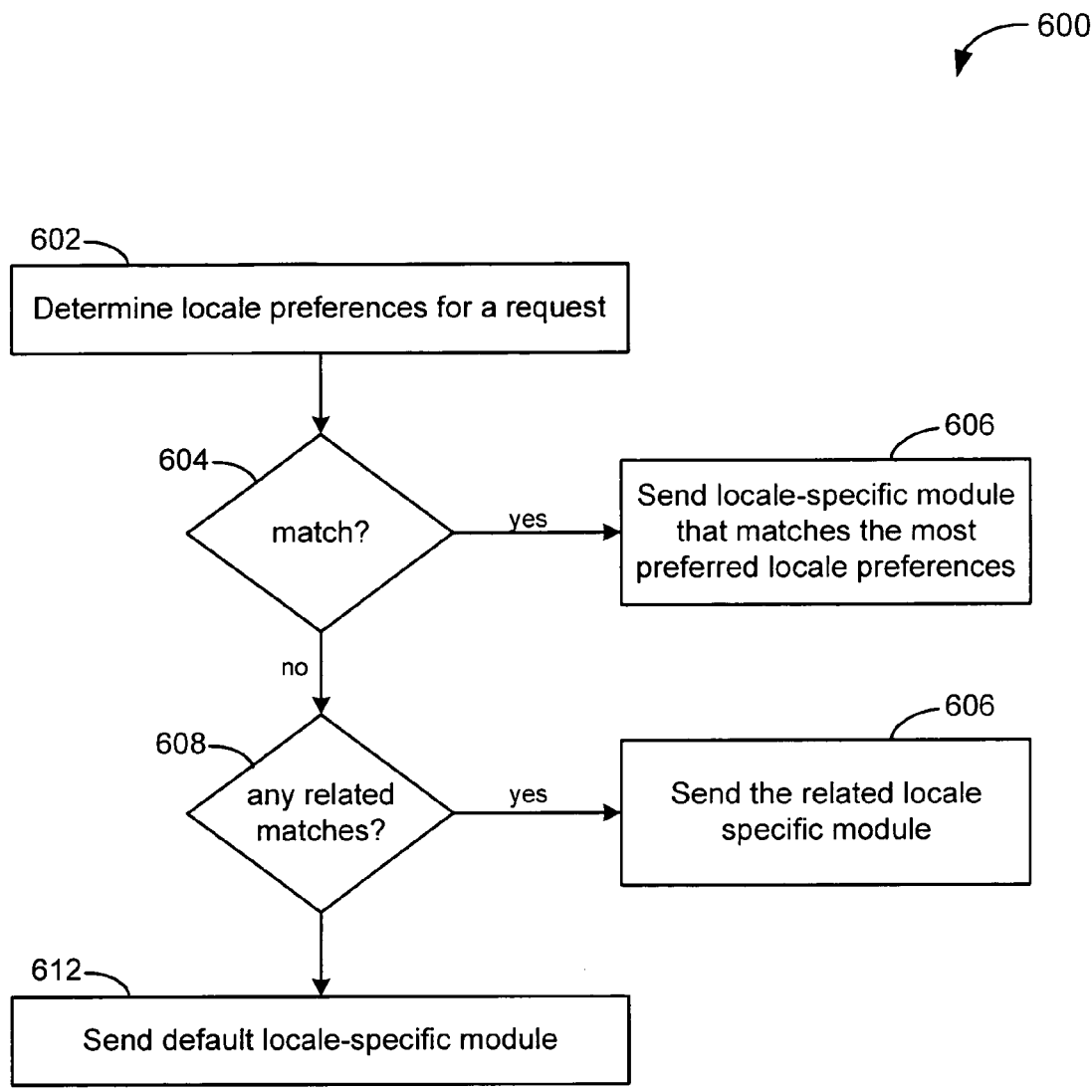
FIG. 6 depicts a simplified flowchart of a method for determining a locale-specific module according to one embodiment of the present invention.

As mentioned above, the locale preferences for a request may not exactly match a locale for locale-specific modules 206 stored in storage device 204. Accordingly, embodiments of the present invention provide fallback logic that is used to determine the best fit for a request. FIG. 6 depicts a simplified flowchart 600 of a method for determining a locale-specific module 206 according to one embodiment of the present invention.

In step 602, locale preferences are determined for the request. As mentioned above, locale preferences may be set by a user in interface 106.

In step 604, it is determined if a locale-specific module 206 matches any of the locale preferences. For example, if English is defined as the locale preference, it is determined if a locale-specific module 206 corresponds to the English locale. The locale preferences may be even more defined than just a locale, such as the locale preferences maybe define a locale such as British-English, Australian-English, American-English, Canadian-English, etc.

In step 606, if there is a match, in step 608, a locale-specific module 206 that matches the most preferred locale preferences is sent to client 102. In the case where a list of locale preferences are sent, the locale-specific module 206 that matches the highest or most preferred locale preference is sent first. If the first or most preferred locale preference is not available, then the next highest locale-specific module 206 that matches a locale preference is sent, and so on.

If a match is not found, in step 610, it is determined if any related locale-specific modules for the locale preferences is available. For example, if the request specifies British-English is preferred, and British-English is not available in a locale-specific module 206, then other related locale-specific modules 206 may be determined, such as American-English, Canadian-English, Australian-English, etc. This may be preferred in that although the locale may be different for terms associated with locale-specific module 206, they may be similar enough that it will be more helpful for the user to see these terms rather than a totally different locale than that recited in the locale preferences.

In step 608, it is determined if any related locale-specific module 206 is determined. If one is determined, then the related locale-specific module 206 is sent to client 102.

If a related locale-specific module 206 is not found, at step 616, a default locale-specific module is sent to client 102. The default locale-specific module 206 may be from any locale. For example, it may default to a most popular locale that is determined. This ensures that the locale-specific module 206 is returned and can be used to display elements on a web page on interface 106.

The process of creating locale-specific modules 206 will now be described. Referring back to FIG. 2, a build-time module 203 is provided that serves as the interface for generating/customizing locale-specific modules 206 for integration into run-time module 201.

In one embodiment, locale-specific modules 206 are formatted such that a scripting locale, such as javascript or VBscript, can access the files in order to display elements. Modules 206 may be generated as delta files for run-time integration. In one embodiment, generation of the modules 206 may be difficult for a wide variety of users because the development of modules 206 would require knowledge of a scripting language. Accordingly, an intermediate language that may be widely known is provided such that a user can provide user definitions in the intermediate language.

In one embodiment, an industry standard XML location interchange file format (XLIFF) is used as the intermediate language. Other language may be used also, such as any XML-based language, HTML, etc. The intermediate language is helpful because it is a universal language that may be known to many users. It is also easier to work with than a native scripting language.

In one embodiment, users may provide user definitions in the intermediate language. Build-time module 203 receives the definitions at intermediate language receiver 210. Intermediate language receiver 210 provides an interface that can be used by a user in order to enter in the intermediate language definitions.

Locale-specific module builder 212 receives the user definitions and is configured to create locale-specific modules 206. In one embodiment, locale-specific module builder 212 converts XLIFF to javascript. In one embodiment, javascript resource files and delta files are created for locale-specific module 206. The locale-specific modules 206 that are generated are configured to be accessed by scripts embedded in web pages that correspond to the modules 206. Accordingly, it is easy to extend user definitions that are provided for locale-specific modules 206 using the intermediate language format.

Embodiments of the present invention provide many advantages. For example, because locale-specific operations are off-loaded to client 102, servers 104 are freed to perform other services. This may speed up the processing of requests at a server 104 and also eliminates server congestion. Also, because locale preferences of interface 106 are used to determine a locale for a user, the web page outputted are based on the locale determined and may be more accurate as to the user's desires. This is different than using an operating system locale preference. Further, with the growing use of scripts embedded in web pages, the use of which are executed on the client side, it is desirable for a client side solution for providing locale-specific information.

Conventionally, if a script was configured to output content in a locale that was not supported by client 102, then an error would be returned. For example, the operating system may have then needed a language pack to be installed, but if that language pack was not installed, the javascript returns an error for the web page. Using embodiments of the present invention, however, a best fit or default locale is used to output elements on a web page. Thus, errors are avoided and a web page is displayed.

Figure 7:
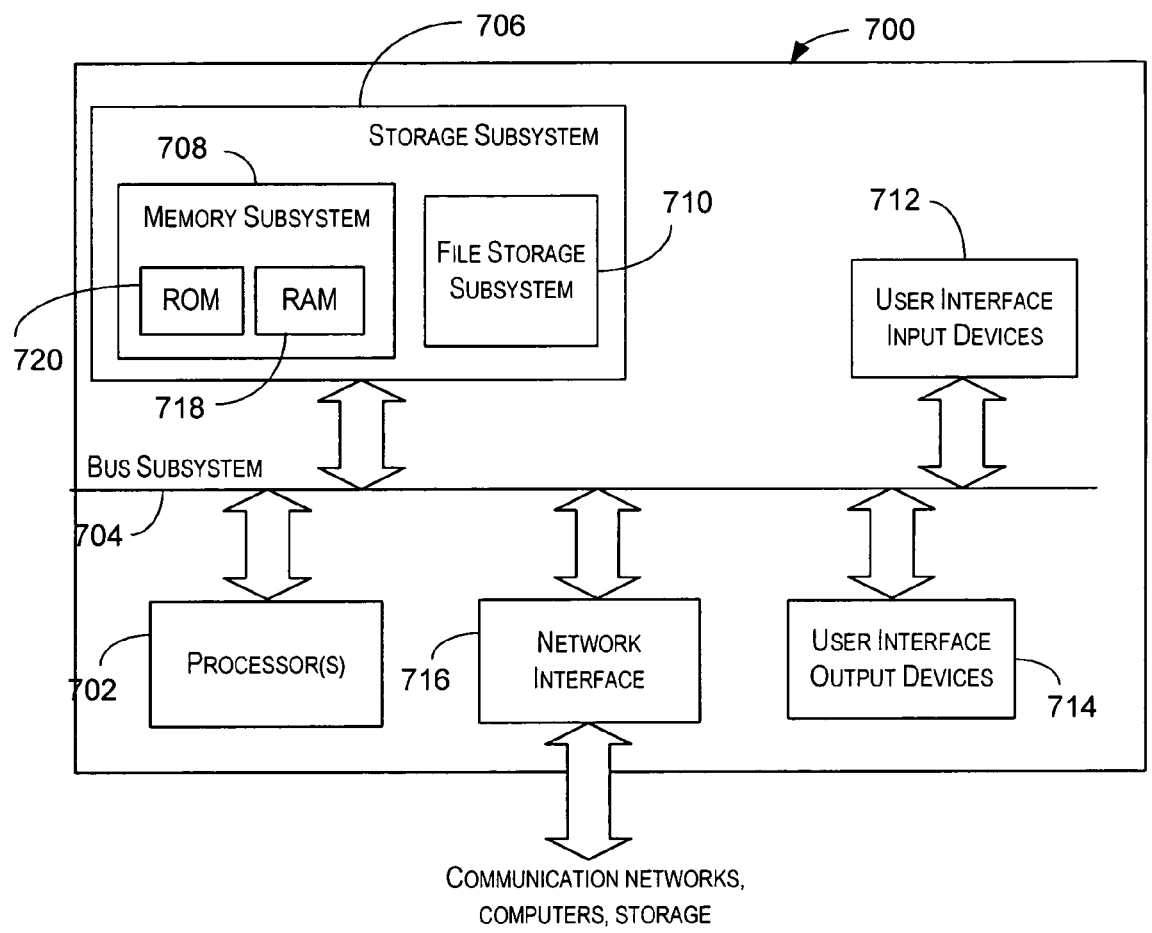
FIG. 7 is a simplified block diagram of data processing system that may be used to perform processing according to an embodiment of the present invention.

FIG. 7 is a simplified block diagram of data processing system 700 that may be used to perform processing according to an embodiment of the present invention. As shown in FIG. 7, data processing system 700 includes at least one processor 702, which communicates with a number of peripheral devices via a bus subsystem 704. These peripheral devices may include a storage subsystem 706, comprising a memory subsystem 708 and a file storage subsystem 710, user interface input devices 712, user interface output devices 714, and a network interface subsystem 716. The input and output devices allow user interaction with data processing system 702.

Network interface subsystem 716 provides an interface to other computer systems, networks, and storage resources. The networks may include the Internet, a local area network (LAN), a wide area network (WAN), a wireless network, an intranet, a private network, a public network, a switched network, or any other suitable communication network. Network interface subsystem 716 serves as an interface for receiving data from other sources and for transmitting data to other sources from data processing system 700. Embodiments of network interface subsystem 716 include an Ethernet card, a modem (telephone, satellite, cable, ISDN, etc.), (asynchronous) digital subscriber line (DSL) units, and the like.

User interface input devices 712 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and ways to input information to data processing system 700.

User interface output devices 714 may include a display subsystem, a printer, a fax machine, or non-visual displays such as audio output devices. The display subsystem may be a cathode ray tube (CRT), a flat-panel device such as a liquid crystal display (LCD), or a projection device. In general, use of the term "output device" is intended to include all possible types of devices and ways to output information from data processing system 700.

Storage subsystem 706 may be configured to store the basic programming and data constructs that provide the functionality of the present invention. For example, according to an embodiment of the present invention, software modules implementing the functionality of the present invention may be stored in storage subsystem 706. These software modules may be executed by processor(s) 702. Storage subsystem 706 may also provide a repository for storing data used in accordance with the present invention. Storage subsystem 706 may comprise memory subsystem 708 and file/disk storage subsystem 710.

Memory subsystem 708 may include a number of memories including a main random access memory (RAM) 718 for storage of instructions and data during program execution and a read only memory (ROM) 720 in which fixed instructions are stored. File storage subsystem 710 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Bus subsystem 704 provides a mechanism for letting the various components and subsystems of data processing system 702 communicate with each other as intended. Although bus subsystem 704 is shown schematically as a single bus, alternative embodiments of the bus subsystem may utilize multiple busses.

Data processing system 700 can be of varying types including a personal computer, a portable computer, a workstation, a network computer, a mainframe, a kiosk, or any other data processing system. Due to the ever-changing nature of computers and networks, the description of data processing system 700 depicted in FIG. 7 is intended only as a specific example for purposes of illustrating the preferred embodiment of the computer system. Many other configurations having more or fewer components than the system depicted in FIG. 7 are possible.

The present invention can be implemented in the form of control logic in software or hardware or a combination of both. The control logic may be stored in an information storage medium as a plurality of instructions adapted to direct an information processing device to perform a set of steps disclosed in embodiment of the present invention. Based on the disclosure and teachings provided herein, a person of ordinary skill in the art will appreciate other ways and/or methods to implement the present invention.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method comprising:
   receiving, at a set of one or more server computers, a request from an interface associated with a client device for a web page created in a specific language, the web page comprising content in the specific language, one or more elements in a first markup language used by an interface of the client device to display the content, and one or more elements in a second markup language, the second markup language being an intermediate non-scripting language different from the first language;
   extracting, with at least one server computer in the set of server computers, a locale-specific preference from a header in the request, the locale-specific preference in the header further including one or more entries that each indicate a preference level for document languages;
   selecting, with at least one server computer in the set of server computers, a locale-specific module corresponding to the locale-specific preference, the selected locale-specific module built in a language supported by a script associated with the requested web page using one or more user-supplied definitions associating an element of the webpage in the second markup language with one or more locale-specific formattings;
   sending, from at least one server computer in the set of server computers, the locale-specific module to the client device for storage at the client device; and
   sending, from at least one server computer in the set of server computers, the requested web page to the client device for storage at the client device, wherein, when the client device encounters the element of the web page in the second markup language when executing the script, the client device uses the locale specific module to determine the one or more locale-specific formattings.

2. The method of claim 1, wherein receiving the request comprises receiving an HTTP request that includes the locale-specific preference.

3. The method of claim 1, wherein receiving the request comprises receiving a request for a document having one or more document-based scripts embedded within.

4. The method of claim 3, wherein the one or more document-based scripts comprises a javascript or a VBscript.

5. The method of claim 4, wherein the javascript or VBscript is executed when the web page is being displayed by the interface, the javascript or VBscript using the locale-specific module to display the web page using the one or more locale-specific formattings.

6. The method of claim 1, wherein the locale-specific preference comprises a locale-specific preference setting of the interface.

7. The method of claim 1, wherein the locale-specific preference comprises a location preference.

8. The method of claim 1, wherein selecting the locale-specific module corresponding to the locale-specific preference comprises:
   determining, at the at least one server computer in the set of server computers, whether a locale-specific module in a plurality of locale-specific modules matches the locale-specific preference; and
   if a match is not found, determining, at the at least one server computer in the set of server computers, a locale-specific module that substantially matches the locale-specific preference in the plurality of locale-specific modules.

9. The method of claim 8, further comprising if a locale-specific module that substantially matches the locale-specific preference is not found, determining, at the at least one server computer in the set of server computers, a default locale-specific module for the locale-specific preference.

10. A system comprising:
   a communications interface that receives requests for web pages from client devices; and
   a hardware processor; and
   a memory storing a set of one or more locale-specific modules that each enable an interface of the client devices to perform one or more locale-specific formatting operations using the web pages when the interfaces render the web pages using one or more scripts associated with the web pages, the memory further storing a set of instructions that when executed by the processor cause the processor to:
      receive a request for a web page created in a specific language from an interface associated with a client device, the web page comprising content in the specific language, one or more elements in a first markup language used by an interface of the client device to display the content, and one or elements in a second markup language, the second markup language being an intermediate non-scripting language different from the first language;
      extract a locale-specific preference from a header in the request, the locale-specific preference in the header further including one or more entries that each indicate a preference level for document languages;
      select a locale-specific module corresponding to the locale-specific preference from the set of locale-specific modules, the selected locale-specific module built in a language supported by a script associated with the requested web page using one or more user-supplied definitions associating an element of the webpage in the second markup language with one or more locale-specific formattings;
      send the locale-specific module to the client device via the communications interface for storage at the client device; and
      send the requested web page to the client device via the communications interface for storage at the client device, wherein, when the client device encounters the element of the web page in the second markup language when executing the script, the client device uses the locale-specific module to determine the one or more locale-specific formattings.

11. The system of claim 10, wherein the interface associated with the client device comprises a web browser.

12. The system of claim 10, wherein the locale-specific preference comprises a locale-specific preference setting of the interface.

13. The system of claim 10, wherein the locale-specific preference comprises a location preference.

14. A non-transitory computer-readable medium having a plurality of computer-executable instructions stored thereon, the non-transitory computer-readable medium comprising:
   instructions for receiving a request from an interface associated with a client device for a web page created in a specific language, the web page comprising content in the specific language, one or more elements in a first markup language used by an interface of the client device to display the content, and one or more one or elements in a second markup language, the second markup language being an intermediate non-scripting language different from the first language;
   instructions for extracting a locale-specific preference from a header in the request, the locale-specific preference in the header further including one or more entries that each indicate a preference level for document languages;
   instructions for selecting a locale-specific module corresponding to the locale-specific module corresponding to the locale-specific preference, the selected locale-specific module built in a language supported by a script associated with the requested web page using one or more user-supplied definitions associating an element of the webpage in the second markup language with one or more locale-specific formattings;
   instructions for sending the locale-specific module to the client device for storage at the client device; and
   instructions for sending the requested web page to the client device for storage at the client device, wherein, when the client device encounters the element of the web page in the second markup language when executing the script, the client device uses the locale specific module to determine the one or more locale-specific formattings.

15. The non-transitory computer-readable medium of claim 14, wherein the instructions for receiving the request comprises instructions for receiving an HTTP request that includes the locale-specific preference.

16. The non-transitory computer-readable medium of claim 14, wherein the instructions for receiving the request comprise instructions for receiving a request for a document having one or more document-based scripts embedded within.

17. The non-transitory computer-readable medium of claim 14, wherein the instructions for determining the locale-specific preference comprises instructions for determining a locale-specific preference setting of the interface.

18. The non-transitory computer-readable medium of claim 14, wherein the instructions for selecting the locale-specific preference for the interface associated with the client from the request comprise:
   instructions for determining whether a locale-specific module in a plurality of locale-specific modules matches the locale-specific preference;
   instructions for, if a match is not found, determining a locale-specific module that substantially matches the locale-specific preference in the plurality of locale-specific modules; and
   instructions for, if a locale-specific module that substantially matches the locale-specific preference is not found, determining a default locale-specific module.

19. The method of claim 1, wherein sending the locale-specific module to the client device comprises sending one or more delta files corresponding to the locale-specific preference, the one or more delta files including only changes that will be recombined on top of a generic formatting of the locale-specific element.

20. The system of claim 10, wherein the processor is further configured to send via the communications interface one or more delta files corresponding to the locale-specific preference, the one or more delta files including only changes that will be recombined on top of a generic formatting of the locale-specific element.

21. The non-transitory computer-readable medium of claim 14, wherein the instructions for sending the locale-specific module to the client device comprise instructions for sending one or more delta files corresponding to the locale-specific preference, the one or more delta files including only changes that will be recombined on top of a generic formatting of the locale-specific element.

22. A method comprising:
sending, by a client device, a request using an interface associated with the client device to a server computer for a web page created in a specific language, the web page comprising content in the specific language, one or more elements in a first markup language that displays the content, and one or more one or elements in a second markup language, the second markup language being an intermediate non-scripting language;
receiving, by the client system, the requested web page;
receiving, by client system, a locale-specific module selected by the server computer system and corresponding to a locale-specific preference extracted by the server computer from a header in the request, the locale-specific preference in the header further including one or more entries that each indicate a preference level for document languages, the locale-specific module built in a language supported by a script of the requested web page using one or more user-supplied definitions associating an element of the webpage in the second markup language with one or more locale-specific formattings; and
rendering, by the client system, the web page for display on a display device using the interface wherein upon encountering one or more elements of the web page in the second markup language when executing the script, using the locale-specific module to determine the one or more locale-specific formattings.

23. The method of claim 1, wherein the one or more locale-specific formattings include date or time formatting.

24. The method of claim 1, wherein the one or more locale-specific formatting operations include one or more operations arranging date information or time information in the requested document that is arranged in the specific language according to the one or more the one or more locale-specific formattings.

* * * * *